(12) United States Patent
Sandberg et al.

(10) Patent No.: US 7,023,620 B1
(45) Date of Patent: Apr. 4, 2006

(54) BEAM ARRAY PITCH CONTROLLER

(75) Inventors: Jon C. Sandberg, Erie, CO (US); James Tristan Thompson, Firestone, CO (US)

(73) Assignee: Research Electro-Optics, Inc., Boulder, CO (US)

( * ) Notice: Subject to any disclaimer, the term of this patent is extended or adjusted under 35 U.S.C. 154(b) by 0 days.

(21) Appl. No.: 10/885,297

(22) Filed: Jul. 1, 2004

Related U.S. Application Data

(60) Provisional application No. 60/485,529, filed on Jul. 3, 2003.

(51) Int. Cl.
G02B 27/10 (2006.01)
G02B 27/14 (2006.01)

(52) U.S. Cl. .................. 359/618; 359/629; 359/638; 359/839

(58) Field of Classification Search ............. 359/618, 359/629, 636, 638–640, 839, 227, 232
See application file for complete search history.

(56) References Cited

U.S. PATENT DOCUMENTS

| | | | |
|---|---|---|---|
| 4,204,771 A | 5/1980 | Shull et al. | |
| 4,566,765 A * | 1/1986 | Miyauchi et al. | 359/618 |
| 4,636,075 A | 1/1987 | Knollenberg | |
| 4,756,602 A | 7/1988 | Southwell et al. | |
| 4,798,465 A | 1/1989 | Knollenberg | |
| 4,813,756 A | 3/1989 | Frenkel et al. | |
| 4,893,928 A | 1/1990 | Knollenberg | |
| 5,037,180 A | 8/1991 | Stone | |
| 5,085,500 A | 2/1992 | Blesener | |
| 5,121,988 A | 6/1992 | Blesener et al. | |
| 5,155,623 A | 10/1992 | Miller et al. | |
| 5,212,584 A | 5/1993 | Chung | |
| 5,291,332 A | 3/1994 | Siebert | |
| 5,331,404 A | 7/1994 | Moeller et al. | |
| 5,400,179 A | 3/1995 | Ito | |
| 5,410,431 A | 4/1995 | Southwell | |
| 5,467,189 A | 11/1995 | Kreikebaum et al. | |
| 5,633,724 A * | 5/1997 | King et al. | 356/445 |
| 5,646,786 A | 7/1997 | Kurtz et al. | |
| 5,719,989 A | 2/1998 | Cushing | |
| 5,751,422 A | 5/1998 | Mitchell | |
| 5,781,268 A | 7/1998 | Liu et al. | |

(Continued)

FOREIGN PATENT DOCUMENTS

EP 1 098 212 A1 5/2001

(Continued)

OTHER PUBLICATIONS

Dingel, BB et al. (1998) "Multifunction Optical Filter with a Michelson-Gires-Tournois Interferometer for Wavelenght-Division-Multiplexed Network System Applications," *Optics Letters* 23(14):1099-1101.

(Continued)

*Primary Examiner*—Ricky Mack
*Assistant Examiner*—Jack Dinh
(74) *Attorney, Agent, or Firm*—Greenlee, Winner & Sullivan, P.C.

(57) ABSTRACT

The present invention provides beam array controllers for changing the spatial and optical characteristics of a beam array. Beam array pitch controllers are provided which are capable of selectively adjusting the spacing between adjacent beams in a beam array. Beam array pitch controllers are provided which are capable of selectively adjusting the brightness and brightness spatial distribution of a beam array. The present invention also provides optical sources for generating a beam array having a selectively adjustable pitch, brightness and brightness spatial distribution.

30 Claims, 8 Drawing Sheets

U.S. PATENT DOCUMENTS

| | | | |
|---|---|---|---|
| 5,798,859 | A | 8/1998 | Colbourne et al. |
| 5,805,781 | A | 9/1998 | McIntyre et al. |
| 5,825,552 | A | 10/1998 | Kurtz et al. |
| 5,828,689 | A | 10/1998 | Epworth |
| 5,872,624 | A | 2/1999 | Chambers et al. |
| 5,926,317 | A | 7/1999 | Cushing |
| 5,999,320 | A | 12/1999 | Shirasaki |
| 6,005,995 | A | 12/1999 | Chen et al. |
| 6,061,132 | A | 5/2000 | Girvin et al. |
| 6,122,043 | A | 9/2000 | Barley |
| 6,154,318 | A | 11/2000 | Austin et al. |
| 6,169,604 | B1 | 1/2001 | Cao |
| 6,169,626 | B1 | 1/2001 | Chen et al. |
| 6,185,168 | B1 | 2/2001 | Kato et al. |
| 6,186,937 | B1 | 2/2001 | Ackerman et al. |
| 6,201,907 | B1 | 3/2001 | Farries |
| 6,208,444 | B1 | 3/2001 | Wong et al. |
| 6,222,673 | B1 | 4/2001 | Austin et al. |
| 6,241,397 | B1 | 6/2001 | Bao et al. |
| 6,249,350 | B1 | 6/2001 | Dultz et al. |
| 6,252,716 | B1 | 6/2001 | Paiam |
| 6,263,128 | B1 | 7/2001 | Huang |
| 6,268,951 | B1 | 7/2001 | Chen et al. |
| 6,275,322 | B1 | 8/2001 | Tai |
| 6,304,689 | B1 | 10/2001 | Dingel et al. |
| 6,317,251 | B1 | 11/2001 | Wang |
| 6,320,663 | B1 | 11/2001 | Ershov |
| 6,373,620 | B1 | 4/2002 | Wang |
| 6,379,984 | B1 | 4/2002 | Sandberg et al. |
| 6,386,718 | B1 | 5/2002 | Qian |
| 6,414,754 | B1 | 7/2002 | Johnson |
| 6,570,711 | B1 | 5/2003 | Ducellier |
| 6,631,033 | B1 | 10/2003 | Lewis |
| 6,683,721 | B1 | 1/2004 | Copner et al. |
| 6,724,789 | B1 | 4/2004 | Vujkovic-Cvijin |
| 6,725,322 | B1 | 4/2004 | Shiraishi et al. |
| 6,765,679 | B1 | 7/2004 | Ducellier et al. |
| 6,804,063 | B1 | 10/2004 | Thompson |
| 6,913,706 | B1 * | 7/2005 | Yan et al. ............ 216/24 |
| 2002/0126354 | A1 | 9/2002 | Jeong et al. |
| 2002/0154314 | A1 | 10/2002 | Copner et al. |
| 2002/0180981 | A1 | 12/2002 | Ducellier et al. |
| 2004/0042083 | A1 | 3/2004 | Turner |
| 2004/0051869 | A1 | 3/2004 | Sandberg et al. |
| 2004/0051870 | A1 | 3/2004 | Sandberg et al. |
| 2004/0080834 | A1 | 4/2004 | Thompson |

FOREIGN PATENT DOCUMENTS

| | | |
|---|---|---|
| WO | WO 95/09354 | 4/1995 |
| WO | WO 00/25154 | 5/2000 |
| WO | WO 2004/006754 A3 | 1/2004 |
| WO | WO 2004/007017 A3 | 1/2004 |
| WO | WO 2004/021527 A3 | 3/2004 |

OTHER PUBLICATIONS

Hect (1987) "The Fabry-Perot Interferometer" *Optics*, 2nd Ed., Addison Wesley Publishing Co., pp. 368-372.

Karow, HH (1993), "Fabrication Methods for Percision Optics;" John Wiley & Sons pp. 35-51. 442-462, 560-563, 644-671, and 714-721.

Moore et al. (1989) "Building Scientific Apparatus," *Optics*, Addison-Wesley Publishing Co., pp. 119-256.

* cited by examiner

NON-EQUIDISTANT COMPRESSION

BEAM ARRAY PITCH CONTROLLER

CROSS-REFERENCE TO RELATED APPLICATIONS

This application claims priority under 35 U.S.C. 119(e) to provisional patent application 60/485,529, filed Jul. 3, 2003, which is hereby incorporated by reference in its entirety to the extent not inconsistent with the disclosure herein.

BACKGROUND OF INVENTION

Beam arrays are device components in a wide variety of optical devices and optical systems. For example, laser beam arrays comprise light sources useful for a range of important applications including optical signal generation, optical sensing and laser pumping. Beam arrays used in these applications include linear beam arrays wherein a plurality of light beams propagate along axes which are substantially confined to a single plane or two dimensional beam arrays wherein light beams have propagation axes which occupy a plurality of planes. The versatility and utility of beam array light sources largely arises from their spatial characteristics and optical properties. Particularly, the order of individual beams in a beam array provides a convenient means of discriminating between light beams corresponding to different optical signals. In addition, the spatial arrangement of light beams in a beam array allows individual light beams to be efficiently optically coupled to a wide variety of selected receiving elements. Furthermore, beam arrays comprise optical sources capable of providing a wide range of radiant powers.

Recent developments in the field of semiconductor laser diodes has resulted in the availability of diode laser bar arrays which provide light sources for a variety of applications in the fields of optical telecommunications, solid state laser pumping and material processing. A diode laser bar array is formed by combining multiple semiconductor diode laser emitters to generate a plurality of diode laser beams. A diode laser consists of a modified p-n junction within a multi-layer semiconductor structure. Lasing action is provided by applying a potential difference across the modified p-n junction. The modified p-n junction is doped and contained within a laser cavity, thus, providing a gain medium for the laser.

Diode laser bar arrays have a number of advantages over conventional optical sources. First, diode laser bar arrays are capable of providing very high radiant powers for a wide variety of lasing wavelengths, routinely providing radiant powers up to about hundreds of Watts. Second, diode laser bar arrays exhibit low power consumption, minimal heat load and long lifetimes. Finally, diode laser bar array light sources are compact, rugged and inexpensive.

Despite the clear benefits of diode laser bar arrays, the full potential of this technology to many optical applications is not currently realized due to several limitations of this technology. First, individual diode laser elements in a laser bar array typically exhibit large beam divergence, which can substantially limit the photon density and brightness of these optical sources. Beam divergence of diode laser elements in a bar array also degrades the efficiency in which these sources can be optically coupled to one or more receiving elements. Second, the pitch of commercially available diode laser bar arrays is substantially limited by the packaging, electronic requirements and cooling schemes of these devices. Limitations on bar array pitch significantly limits the photon densities and brightnesses achievable using laser diode bar array optical sources.

It will be appreciated from the foregoing that a need exists for high power beam array light sources. Particularly, beam array light sources having a selectively adjustable pitch and brightness are needed. Accordingly, it is an object of the present invention to provide methods, devices and device components capable of efficiently controlling the propagation axes of light beams in a beam array. The present invention provides pitch controllers providing selective control over the spacing between adjacent beams in a beam array. In addition, the present invention provides beam array controllers capable of efficiently coupling light beams in a beam array to one or more receiving devices or photosensitive materials. Further, the present invention provides methods and devices for selectively adjusting the brightness and brightness spatial distribution of a beam array, particularly well suited for parallel beam arrays.

SUMMARY OF THE INVENTION

This invention provides methods, devices, and device components for controlling a plurality of light beams, such as a beam array or parallel beam array. More particularly, the present invention relates to methods and devices for selectively adjusting the optical and spatial characteristics of light beams in a beam array. The present invention includes beam array controllers capable of selectively adjusting the positions of individual light beams in a beam array and reordering light beams in a beam array. The present invention provides beam array pitch controllers capable of selectively adjusting the photon density and power distributions of a beam array. Beam array controllers and beam array pitch controllers of the present invention are versatile devices capable of efficiently controlling the spatial and optical characteristics of beam arrays comprising a variety of light beam types, such as continuous wave laser beams, pulsed laser beams, and collimated non-laser light beams, having a broad range of wavelengths. Beam array controllers and beam array pitch controllers of the present invention also provide a means of adjusting the optical and spatial characteristics of high intensity light beams beam with minimized loss of light.

In one aspect, the present invention provides methods, devices and device components for controlling the spatial orientations of light beams in a beam array. Beam array controllers of the present invention provide a means of controlling the spacing and relative position of propagation axes corresponding to a plurality of light beams in a beam array, such as a parallel beam array. Beam array controllers of the present invention provide a means of directing light beams in a beam array to one or more receiving optical devices or device components, such as fiber optic elements, a fiber bundle, an optical coupler, fiber optic device or an array of photodetectors. In addition, beam array controllers of the present invention provide a means of controlling and selectively adjusting the sequence of a plurality of light beams in a beam array, particularly useful for reordering and directing selected light beams onto selected photodetectors, fiber optic elements, and/or fiber optic devices. In a preferred embodiment, a beam array controller of the present invention is capable of selectively adjusting the spacing between light beams in a beam array, such as a one-dimensional beam array or two-dimensional beam array. Beam pitch controllers of the present invention are especially useful for increasing or decreasing the spacing between light beams in a parallel beam array.

In another aspect, the present invention provides methods, devices and device components for controlling the brightness, brightness spatial distribution, photon density and radiant energy distributions of a beam array, such as a diode laser bar array. In one embodiment, the present invention provides a means for adjusting the distribution of radiant energy along an axis orthogonal to the propagation axes of a plurality of parallel light beams. Methods and devices of the present invention can provide a power distribution that is symmetrical or asymmetrical with respect to one or more defining axes, such as axes orthogonal to the propagation axes of one or more beams in a beam array. In a preferred embodiment, the present invention includes a beam array pitch controller useful for manipulating the brightness of a beam array comprising a plurality of optical beams, such as a diode laser linear bar array. Beam pitch controllers of the present invention are optically efficient and exhibit very low losses of light, preferably for some applications exhibiting losses less than 5%.

In one aspect, the present invention provides a means for selectively adjusting the pitch of a set of input beams propagating along optical axes parallel to a input axis and having a first pitch, $P_1$. An exemplary beam array controller comprises a first surface and a second surface positioned parallel to the first surface and spaced apart from the first surface by a selected distance, W. The first surface has a reflective region for receiving at least a portion of the set of input beams and for generating a first reflected set of output beams propagating along optical axes parallel to an output axis which is different than the input axis. The second surface has a plurality of alternating reflective regions and transmissive regions for receiving at least a portion of the set of input beams and for generating a second reflected set of output beams propagating along optical axes parallel to the output axis.

To provide beam array pitch control, first and second reflected sets of output beams are combined to form a set of output beams propagating along optical axes parallel to the output axis and having a second pitch, $P_2$, wherein $P_2 \neq P_1$. In one embodiment, a beam array pitch controller of the present invention comprises a beam array pitch compressor, wherein $P_2 < P_1$. In an alternate embodiment, a beam array pitch controller of the present invention comprises a beam array pitch expander, wherein $P_2 > P_1$. In an exemplary embodiment preferred for some applications, the present invention provides beam array pitch compressors and expanders wherein $P_2 = 2P_1$ or $P_2 = P_1/2$. Exemplary beam array pitch controllers of the present invention are capable of generated a change in pitch determined by the equations: $P_2 = XP$, or $P_2 = P_1/X$, wherein X is an integer.

In one embodiment, first and second surfaces useful in the present invention comprise sides of separate prism elements. Positioning of separate prism elements having first and second surfaces can be provided by any method or device capable of ensuring that first and second surfaces are parallel and separated by a selected distance, W. In an exemplary embodiment, positioning of separate prism elements having first and second surfaces is provided by an alignment spacer or an optical mounting system. In a preferred embodiment, first and second surfaces are operationally coupled to an alignment spacer or mounting system by optical contact, by optical adhesive or optical cement.

Alternatively, in another embodiment, first and second surfaces comprise opposing parallel, sides of a unitary alignment prism. An advantage to an optical geometry employing first and second surfaces of a unitary alignment prism is that the parallel sides of the alignment prism can be fabricated to a very high extent of parallelism by conventional optical fabrication methods such as double sided lapping techniques.

Reflective regions of first and second surfaces of the present invention comprise any means of generating reflectivity, preferably for some applications high reflectively. In an exemplary embodiment, reflective regions of the present invention comprise a plurality of thin dielectric film layers and/or thin semiconductor film layers comprising alternating high index of refraction and low index of refraction layers. Alternatively, reflective regions of the present invention comprise total internal reflection (TIR) surfaces, preferably for some applications enclosed TIR surfaces. Alternatively, reflective regions of the present invention comprise one or more thin metallic layers.

Thin dielectric film layers, thin semiconductor film layers, TIR surfaces or any combination of these are preferred for applications of the present invention requiring high optical efficiency because they provide highly reflective regions exhibiting very little absorption, preferably less than 1% absorption and more preferably less than 0.1% absorption. TIR surfaces are preferred for applications wherein the polarization scheme of the inlet beams or the polarization state of one or more selected inlet beams is preferably preserved because these surfaces provide high reflectivity without a significant wavelength dependent phase change between s and p polarization components. Enclosed TIR surfaces are preferred for some applications because these reflective surfaces are protected and, thus, less susceptible to degradation caused by unwanted deposition of materials or deformation of the TIR surface. In addition, use of enclosed TIR surfaces is beneficial because the optical geometry of these surfaces places fewer limitations on the overall optical geometry of the optical components than conventional exposed TIR surfaces. Therefore, enclosed TIR surfaces are more conveniently integrated into complex optical devices than conventional exposed TIR surfaces.

The present invention includes beam array pitch controllers providing a selected, fixed change in beam array pitch. In one embodiment, for example, beam array controllers of the present invention provide a ratio of the pitch of the inlet beam set to the pitch of the outlet beam set ($P_1/P_2$) which is constant for long operation periods and, thus, provides very stable pitch control. Exemplary pitch controllers of this aspect of the present invention further comprise one or more alignment spacers positioned between first and second surfaces for maintaining a constant, selected distance, W, between the first and second surfaces. An optical geometry capable of maintaining a constant distance between first and second surfaces, such as first and second parallel surfaces, is beneficial because it results in a set of output beams having a constant pitch optimized for a particular application, such as coupling a beam set to a series of fixed position detectors, fixed position optical couplers, or other optical devices. In an exemplary embodiment, first and second surfaces are parallel first and external second sides of a unitary alignment spacer. Alternatively, an alignment spacer is disposed between first and second parallel surfaces in any manner maintaining a selected spacing between them. In a preferred embodiment providing a highly stable pitch adjustment, first and second prism elements are operationally coupled to first and second sides of an alignment spacer via optical contact, optical adhesive or optical cement.

In another aspect, the present invention provides beam array pitch controllers wherein the distance between first and second surfaces is selectively adjustable. Methods and devices of the present invention provide embodiments wherein the distance between first and second surface are capable of being selectively adjusted or selectively modulated. This aspect of the present invention is beneficial for some applications because it allows the angle of incidence of the set of input beams to be selectively varied while maintaining efficient beam array compression or expansion. The ability to vary the angle of incidence is desirable because it allows beam sets to be more efficiently steered and/or positioned onto a series of detectors, fiber optical couplers or a plurality of photosensitive materials. A preferred beam array pitch controller having a selectively adjustable spacing between first and second surfaces comprises a dynamic alignment spacer which provides a means of selectively adjusting the distance, W, between said first and second surfaces. Exemplary dynamic alignment spacers include, but are not limited to, piezoelectric elements, electrooptic modulators, electrostrictive materials and tunable optical positioning mounts.

In an embodiment, beam array controllers of the present invention comprise one or more additional surfaces having alternating reflective regions and transmissive regions. In an exemplary embodiment, a third surface having alternating reflective regions and transmissive regions is positioned parallel to the first surface and spaced apart from the first surface by a selected distance, Y. The third surface receives at least a portion of the set of input beams and generates a third reflected set of output beams propagating along optical axes parallel to the output axis. To provide beam array pitch control, first, second and third reflected sets of output beams are combined to form a set of output beams propagating along optical axes parallel to the output axis and having a second pitch, $P_2$, wherein $P_2 \approx P_1$. Use of optical geometries with additional surfaces having alternating reflective regions and transmissive regions is beneficial because in some instances these geometries are capable of providing a greater extent of pitch compression or expansion than geometries limited to first and second surfaces.

The present invention also includes optical arrangements comprising a plurality of beam array controllers and/or pitch compressors arranged in series or in parallel to achieve a selected spatial orientation of light beams in a beam array or selected photon density and/or brightness distributions. In an exemplary embodiment, a set of output beams of a first beam array pitch controller is directed through one or more additional pitch controllers to provide additional beam compression or expansion. Beam array controllers and beam array pitch controllers of the present invention are particularly useful for operation in series because they exhibit very low losses of light and can be configured to preserve the polarization scheme of a set of input beams.

Beam array controllers of the present invention are capable of generating a plurality of output beams wherein adjacent output beams are separated by the same distances. Embodiments of the present invention capable of generating equidistant output beams are beneficial for directing a beam array to a plurality of detectors or receiving devices positioned at equally spaced intervals along a defining axis. Alternatively, beam array controllers of the present invention are capable generating a plurality of output beams wherein adjacent output beams are not separated by the same distances. For example, beam array controllers of the present invention are capable of generating spatially segregated beam subgroups wherein the beam spacing within a given beam subgroup is closer than the spacing between different subgroups. Embodiments of the present invention capable of generating non-equidistant output beams are capable of generating output beams which are symmetrically or asymmetrically disposed along one or more defining axis positioned orthogonal to the axis of propagation.

In another aspect, the present invention includes beam array controllers having first and second surfaces which are not parallel. Beam array controllers having a non-parallel optical geometry provide a means for converting a set of input beam propagating along parallel optical axes into a plurality of output beam sets, wherein each output beam set is characterized by one or more output beams propagating along a distinct output beam axis. Beam array controllers of this aspect of the present invention are useful for physically separating optical signals in an optical telecommunications system, for example in spatial filtering applications. In addition, beam array controllers of this aspect of the present invention are useful for providing a plurality output beam sets for illuminating a plurality of materials or optical devices disposed on different optical axes.

In another aspect, the present invention provides optical sources providing a beam array, preferably a parallel beam array, having selected photon density and/or power distributions. The present invention provides optical sources and methods for optically pumping materials, such as the gain material in a laser cavity or a photosensitive material in a photochemical reactor or process, wherein the brightness or brightness spatial distribution is capable of selectively adjustment. The ability to selectively adjust the brightness or brightness spatial distribution of illumination sources of the present invention is beneficial for controlling the rates of optical pumping and/or the rates of photochemical processes. The present invention includes illumination sources having selectively adjustable illumination intensities and power distributions for illuminating photosensitive materials. Optical light sources of the present invention are also capable of generating light beams having selectively adjustable positions.

An exemplary optical source of the present invention comprises: a light source for generating a set of input beams propagating along optical axes parallel to a input axis and having a first pitch, $P_1$, (2) a first surface in optical communication with the light source, the first surface having a reflective region for receiving at least a portion of the set of input beams and for generating a first reflected set of output beams propagating along optical axes parallel to an output axis which is different than the input axis; and a second surface positioned parallel to the first surface and spaced apart from the first surface by a selected distance, W, the second surface having a plurality of alternating reflective regions and transmissive regions for receiving at least a portion of the set of input beams and for generating a second reflected set of output beams propagating along optical axes parallel to the output axis. In this embodiment, the first and second reflected sets of output beams combine to form a set of output beams propagating along optical axes parallel to the output axis and having a second pitch, $P_2$, wherein $P_2$ does not equal $P_1$. Exemplary optical sources of this aspect of the present invention provide a set of output beams propagating along optical axes parallel to the output axis having a selectively adjustable brightness, brightness spatial distribution and/or pitch.

In another aspect, the present invention comprises a method of changing the pitch and/or the brightness of a set of input beams propagating along optical axes parallel to a input axis and having a first pitch, $P_1$. An exemplary method of changing the pitch and/or the brightness comprises the steps: (1) directing at least a portion of a set of input beams onto a first surface having a reflective region, thereby generating a first reflected set of output beams propagating along optical axes parallel to an output axis which is different than an input axis; (2) directing at least a portion of the set of input beams onto a second surface positioned parallel to the first surface and spaced apart from the first surface by a selected distance, W, wherein the second surface has a plurality of alternating reflective regions and transmissive regions positioned parallel to said first surface, thereby generating a second reflected set of output beams propagating along optical axes parallel to the output axis; and (3) positioning the alternating reflective regions and said transmissive regions of the second surface such that the first and second reflected sets of output beams combine to form a set of output beams propagating along optical axes parallel to the output axis and having a second pitch, $P_2$, wherein $P_2 \approx P_1$.

The invention is further illustrated by the following description, examples, drawings and claims.

DETAILED DESCRIPTION OF THE INVENTION

Figure 1:
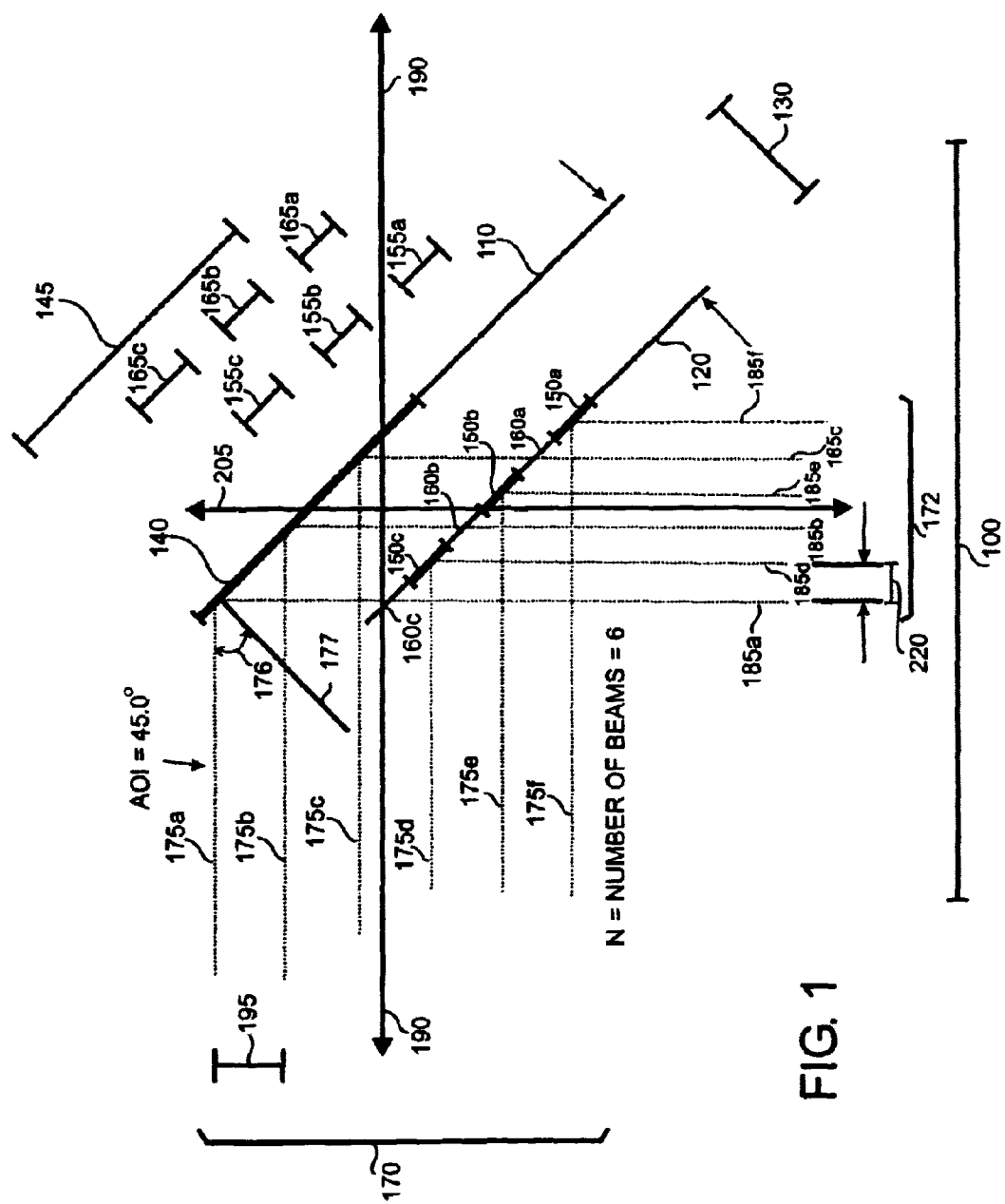
FIG. 1 is a schematic drawing showing a top plan view of a beam array pitch controller having a parallel, dual reflective surface optical geometry. Also shown in FIG. 1 are a set of input beams having angles of incidence equal to 45° from surface normal.

Referring to the drawings, like numerals indicate like elements and the same number appearing in more than one drawing refers to the same element. In addition, hereinafter, the following definitions apply:

"Pitch" refers to a spatial characteristic related to the distance between two points, lines, or axes. In the context of a beam array, pitch refers to the distance between the propagation axes of individual light beams in the array. In the context of a parallel beam array, pitch refers to the beam spacing of propagation axes of a series of parallel beams. Extent of compression or expansion (M) refers to the ratio of the pitch of an input beam set ($P_1$) and the pitch of an output beam set ($P_2$); $M=(P_1)/(P_2)$.

"Beam array" refers to a plurality of light beams. Beam arrays comprise pulsed laser beams, continuous wave laser beams, non-laser light beams and all equivalents known in the art. "Parallel beam array" refers to a plurality of light beams propagating along axes that are parallel to a defining axis, such as an input axis or an output axis. "One-dimensional beam array" and "linear beam array" are used synonymously and refer to a series of light beams wherein the propagation axes of the beams are substantially confined to a single plane. Two-dimensional beam arrays are a series of light beams wherein the propagation axes of the beams occupy a plurality of planes. Beam array controllers and pitch compressors of the present invention are capable of selectively adjusting the spacing between beams in one-dimensional or two dimensional beam arrays.

"Beam array controller" refers to a device or device component for adjusting the spatial characteristics, optical characteristics or both of a beam array. Exemplary beam array controllers of the present invention are capable of, for example, adjusting the propagation axis of individual beams in a beam array, adjusting the brightness and brightness spatial distribution of a beam array, adjusting the pitch of a set of a parallel light beams, and adjusting the photon density of a beam array. Beam array controllers of the present invention comprise a means of directing one or more light beams of a beam array to one or more detectors, fiber optic elements, optical couplers, fiber optic devices or photosensitive materials.

"Set of input beams" refers to a plurality of light beams. Sets of input beams useable in the present invention include one-dimensional beam arrays and two-dimensional beam arrays. Sets of input beams useable in the present invention include parallel beam sets or nonparallel beam sets.

"Beam array pitch controller" refers to a device or device component for adjusting the pitch of a beam array. Beam array pitch controllers provide a means of increasing or decreasing the spacing between propagation axes of adjacent beams in beam array. Beam array pitch controllers of the present invention are particularly useful for changing the pitch of a parallel beam array.

"Light beam" refers to light propagating along a set of propagation axes. In a preferred embodiment, the set of propagation axes of a light beam includes propagation axes that are preferably proximate to each other. In a preferred embodiment, the set of propagation axes of a light beam includes axes that are substantially parallel, preferably exhibiting deviations from absolutely parallelisms which are less than 10 degrees. The distribution of propagation axes of light in a light beam can be symmetric or asymmetric with respect to one or more defining axes. The term light beam is intended to be interpreted consistently with the meaning of this term held by persons skilled in the art of optics and optical devices. Light beams useable in an embodiment of the present invention can be collimated, non-collimated, focused or divergent. Light beams useable in an embodiment of the present invention can have any shape including, but not limited to, substantially cylindrical shape, substantially conical shape and substantially cuboid shape. Light beams useable in the present invention can be generated by a range of optical sources including, but not limited to, laser sources, non-laser sources, lamps, radiating bodies, pulsed light sources, continuous light sources, wide area light sources or any combination of these.

"Planar" refers to a spatial characteristic of a surface wherein all points of the surface reside in the same plane. As used herein, the term planar is intended to encompass some deviation from absolutely planar characteristics. Deviations from absolute planar characteristics can be quantified with respect to the angle of a vector extending form the center point of a planar surface to the point deviating from the plane containing the planar surface. Preferred planar surfaces exhibit deviations from absolutely planar characteristics which are less than 50 arcminutes. More preferred planar surfaces exhibit deviations from absolutely planar characteristics which are less than 6 arcminutes.

"Parallel" refers to a geometry in which two surfaces are equidistant from each other at all points and have the same direction or curvature. As used herein, the term parallel is intended to encompass some deviation from absolute parallelism. Preferred parallel surfaces exhibit deviations from absolute parallelism which are less than 100 arcminutes. More preferred parallel surfaces exhibit deviations from absolute parallelism which are less than 50 arcminutes. Most preferred parallel surfaces exhibit deviations from absolutely absolute parallelism which are less than 5 arcminutes.

"Ultra flat" refers to an extent of surface irregularity of a given optical surface with a deviation from average surface position approximately on the order of the light impinging on the surface. The spatial frequency of an ultra flat optical surface is smaller than the frequency of light impinging on the surface. In a preferred embodiment, ultra flat surfaces of the present invention have deviations from average surface position of less than 50 nm.

"Ultra smooth" refers to an extent of surface irregularity of a given optical surface wherein the lateral distance between prominent surface features is substantially smaller than the wavelength of light impinging on the surface. The spatial frequency of an ultra smooth optical surface is greater than the frequency of light impinging on the surface. In a preferred embodiment, ultra smooth surfaces of the present invention have deviations from average surface position of less than 1 Angstrom.

"Optical contact" refers to a method of bonding two optical elements. A preferred method of optical contact coupling comprises the steps of: (1) cleaning and polishing the interface surfaces of the optical elements to be bonded, (2) laying the surfaces together at an optical interface and (3) applying a force to both surfaces such that the air between the interface surfaces is displaced and optical contact is achieved. Optical contact is preferred for fabricating beam array controllers and beam array pitch controllers of the present invention because this method does not significantly affect the transmission of light through bonded elements and because this method provides a robust and durable bond between two optical elements. In addition, optical contact is preferred for some applications because it does not degrade the extent of parallelism achieved between first and second surfaces.

"TIR surface" refers to a surface wherein an incident light beam is substantially reflected by total internal reflection. TIR occurs when an incident light beam passes from one material to a second material having an index of refraction less than that of the first material and occurs at incident angles greater than a critical angle defined by the expression:

$$\sin\theta_c = \frac{n_2}{n_1} \quad (I)$$

wherein $\theta_c$ is the critical angle, $n_1$ is the refractive index of the first material and $n_2$ is the refractive index of the second material. In one embodiment, the first material is $SiO_2$ and the second material is air at standard temperature and pressure. Use of TIR in beam array controllers and pitch controllers of the present invention is preferred in some embodiments because it provides very high reflectivity over a very broad range of wavelengths. In addition, use of TIR is preferred in some embodiments because it reduces wavelength dependent changes in the phases of s- and p-polarization beam components. "Enclosed TIR surface" refers to a TIR surface that is substantially or completely surrounded by one or more enclosing elements. Exemplary enclosed TIR surfaces are not exposed to the ambient surroundings. An exemplary enclosed TIR surface comprises a TIR cavity disposed on the surface of a substrate which is opposite one or more incident beams. The TIR cavity has a lower refractive index than the substrate and is surrounded on the side opposing the substrate by one or more enclosing elements capable of preventing damage to the TIR surface. Materials useful for enclosing TIR surfaces include but are not limited to $SiO_2$, polymeric materials, plastics, thermoplastics, thermosets, glass, and fused silica. In a preferred embodiment, the TIR cavity has a thickness that is greater than about three wavelengths corresponding to the wavelength of the incident beam, more preferably greater than about six wavelengths corresponding to the wavelength of the incident beam. In a preferred embodiment, the substrate is $SiO_2$ and the TIR cavity is filled with air at standard temperature and pressure. Enclosed TIR surfaces are preferred for some applications because the surface providing TIR is protected, and unwanted deposition of material or surface deformation can be effectively minimized or complete avoided.

"The extent of beam array pitch compression" and "the extent of beam array pitch expansion" both refer to the magnitude of the change in beam array pitch generated by a beam array controller or beam array pitch controller of the present invention. Quantitatively, "the extent of beam array pitch compression" can be expressed in terms the ratio of the first pitch of a set of input beams to the second pitch of a set of output beams ($P_1/P_2$) and "the extent of beam array pitch expansion" can be expressed in terms of the ratio of the second pitch of a set of output beams to the first pitch of a set of input beams ($P_2/P_1$).

"Optical efficiency" refers to the ability of an optical device or device component to transmit a light beam or plurality of light beams with low light losses. Beam array controllers and beam array pitch controllers for some applications have high optical efficiency and transmit at least 95% of incident light. More preferred beam array controllers and beam array pitch controllers for some applications transmit 99.5% of incident light.

"Brightness" refers to a property quantifying the intensity of light of an optical source, such as a plurality of light beams. Brightness can be characterized in terms of the energy flux per solid angle per unit of frequency. "Brightness spatial distribution" refers to the distribution of brightness over one or more defining axes, such as a defining axis oriented perpendicular to the propagation axes of a parallel beam array. Beam array controllers and beam array pitch controllers of the present invention provide a means of adjusting the brightness and brightness spatial distribution of a set of input beams.

"Thin film layer" refers to a thin film comprising a coating of atoms, molecules or ions or mixtures thereof. In one embodiment, thin film layers useable in the present invention comprise a single-layer or a plurality of thin film layers.

Thin film layers useable in the present invention can have either a homogeneous composition or a heterogeneous composition and can comprise a single phase or a plurality of phases. Thin film layers of the present invention include but are not limited dielectrics, semiconductors, metals and any combinations of these materials. In a preferred embodiment, reference to thin dielectric layers in the present invention includes but is not limited to metal oxide, metalloid oxide and salt thin films. Metal oxides, metalloid oxides and salts useable in the present invention include but are not limited to $Ta_2O_5$, $SiO_2$, $HfO_2$, $TiO_2$, $MgF_2$, $CaF_2$, $Nb_2O_5$, glass or mixtures of these materials. Thin metalloid and metal layers of the present invention include but are not limited to Si and Al. Thin film layers of the present invention can be any size, shape, thickness or optical thickness. Thin film layers of the present invention include but are not limited antireflection coatings, partially reflective optical coatings, polarization selective optical coatings, highly reflective coatings, and phase correcting coatings.

"Prism element" refers to an optical element or device component having a geometric shape of a prism. Prism elements of the present invention can have any prism shape including, but not limited to, cubes, triangular prisms, hexagonal prisms, right prisms, cuboids, pentagonal prisms, octagonal prisms, augmented triangular prisms and augmented cuboids.

In the following description, numerous specific details of the devices, device components and methods of the present invention are set forth in order to provide a thorough explanation of the precise nature of the invention. It will be apparent, however, to those of skill in the art that the invention can be practiced without these specific details. Reference in the specification to "a preferred embodiment," "a more preferred embodiment" or "an exemplary embodiment" means that a particular feature, structure, or characteristic set forth or described in connection with the embodiment is included in at least one embodiment of the invention. Reference to "preferred embodiment," "a more preferred embodiment" or "an exemplary embodiment" in various places in the specification do not necessarily refer to the same embodiment.

This invention provides beam array controllers for changing the spatial and optical characteristics of a beam array. In particular, the present invention provides beam array pitch controllers for changing the spacing between adjacent beams in a beam array and for adjusting the brightness and brightness spatial distribution of a beam array.

FIG. 1 illustrates an exemplary beam array pitch controller having a parallel, dual reflective surface optical geometry, particularly useful for achieving beam compression or expansion by a factor of 2. The illustrated pitch controller 100 comprises a first surface 110 in optical communication with second surface 120. Second surface 120 is positioned parallel to the first surface 110 and spaced apart from the first surface by a selected distance, W 130. First surface 110 has a reflective region 140 which extends a selected distance 145 along first surface 110. Second surface 120 has a plurality of reflective regions 150a, 150b and 150c which extend selected lengths 155a, 155b and 155c along second surface 120, respectively. Second surface 120 also has a plurality of transmissive regions 160a, 160b and 160c which extend selected lengths 165a, 165b and 165c along second surface 120, respectively. In an exemplary embodiment, transmissive surfaces comprise anti-reflection thin film coatings, preferably for some applications having a reflectivity less than 0.5% and more preferably 0.2% Alternatively, transmissive surfaces comprise index matched optical cement or optical contact. As illustrated in FIG. 1, reflective regions 150a, 150b and 150c and transmissive regions 160a, 160b and 160c together comprise an alternating pattern of reflective regions and transmissive regions on second surface 120.

The optical paths of a set of input beams 170 and a set of output beams 172 are also shown in FIG. 1. Input beams 175a, 175b, 175c, 175d, 175e and 175f propagate along optical axes parallel to an input axis 190 and adjacent input beams are separated by a constant, first beam pitch, $P_1$ 195. In the embodiment shown in FIG. 1, input beams 175a, 175b, 175c, 175d, 175e and 175f are oriented at angles of incidence 176 equal to 45° from surface normal 177, with respect to first surface 110 and second surface 120. Input beams 175a, 175b and 175c are reflected by reflective region 140 of first surface 110 and form a first reflected set of output beams 185a, 185b, 185c propagating along optical axes parallel to an output axis 205. Input beams 175d, 175e and 175f are reflected by reflective regions 150c, 150b and 150a, respectively, of second surface 120 and form a second reflected set of output beams 185d, 185e, 185f propagating along optical axes parallel to an output axis 205. First reflected set of output beams 185a, 185b, 185c are transmitted through transmissive regions 160c, 160b and 160a, respectively, of second surface 120 and combine with second reflected set of output beams 185d, 185e, 185f to form a set of output beams 172 propagating along optical axes parallel to an output axis 205. Adjacent output beams 172 are separated by a constant, second beam pitch, $P_2$ 220, which is different than first pitch, $P_1$ 195. In a preferred embodiment, $P_2$ 220 is equal to one half of $P_1$ 195.

In an embodiment, reflective regions 150a, 150b and 150c extend distances 155a, 155b and 155c along second surface 120 selected to provide substantially complete reflection of all portions of input beams 175d, 175e and 175f. In this embodiment, therefore, distances 155a, 155b and 155c are principally determined by the beam diameters of input beams 175d, 175e and 175f. Similarly, transmissive regions 160a, 160b and 160c extend lengths 165a and 165b selected to provide substantially complete transmission of all portions of input beams 175a, 175b and 175c and, therefore, are principally governed by the beam diameters of the input beams 175a, 175b and 175c. Reflective region 140 extends a distance 145 along first surface 110 selected to provide substantially complete reflection of all portions of input beams 175a, 175b and 175c. In an alternative embodiment, first surface 110 has a plurality of reflective regions for providing substantially complete reflection of input beams 175a, 175b and 175c. In another alternative embodiment, first surface has one or more transmissive regions, non-transmissive regions, absorbing regions, scattering regions or any combination of these. In addition to transmissive regions and reflective regions, second surface can comprise one or more non-transmissive regions, absorbing regions, scattering regions or any combination of these. Reflective regions useable in the present invention include planar reflective surfaces, curved reflective surfaces or combinations of these. Use of curved reflective surfaces in the present invention is beneficial for applications requiring focusing or collimation of input beams and/or output beams. In an embodiment, alternating reflective regions and transmissive regions of the present invention comprise a symmetric pattern on second surface 120 or an asymmetric pattern on second surface 120.

Figure 2:
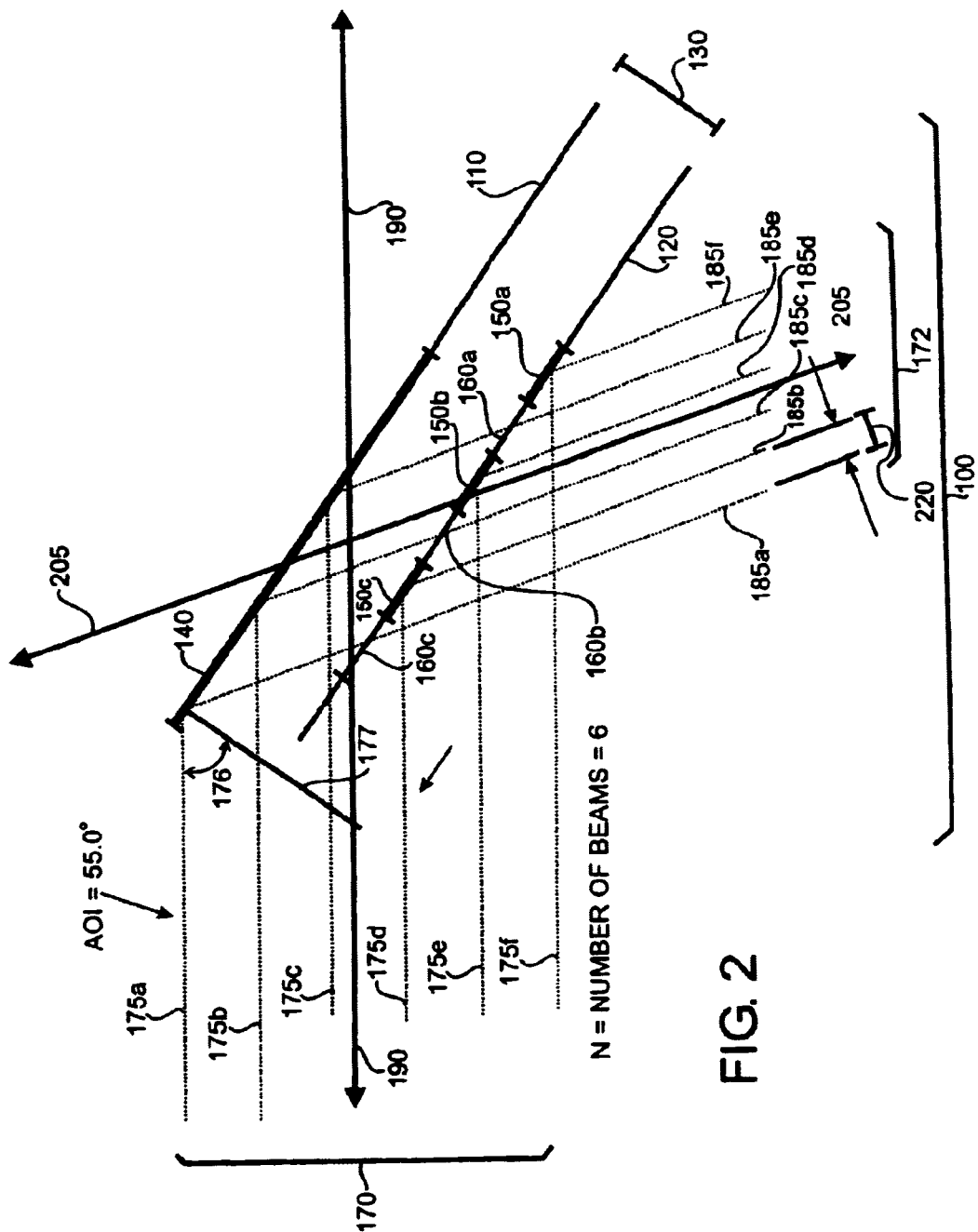
FIG. 2 is a schematic drawing showing a top plan view of a beam array pitch controller having a parallel, dual reflective surface optical geometry. Also shown in FIG. 2 is a set of input beams having angles of incidence equal to 55° from surface normal.

FIG. 2 shows the exemplary beam array pitch controller 100 upon changing the angles of incidence 176 of set of input beams 170 to equal to 55° from surface normal 177 with respect to first surface 110 and second surface 120. As illustrated in FIG. 2, similar beam array compression is also achieved for this angle of incidence. Variation of the angles of incidence, however, substantially affects the spatial orientation of the output axis 205 relative to input axis 190. Specifically, increasing the angles of incidence increases the corresponding angles of reflection for beams 175a, 175b, 175c, 175d, 175e and 175f resulting in a larger angle between input axis 190 and output optical axis 205. Accordingly, variation of the angle of incidence in this embodiment comprises a means of selectively adjusting the orientation of the propagation axes of output beams. The ability to control orientation of the propagation axes of the output beams is beneficial because it provides a means of directing the output beams onto photosensitive materials, optical coupling devices and/or detectors. Preferred embodiments of the present invention are capable of efficiently compressing or expanding input beams having angles of incidence selected over the range of about 25° to about 65° from surface normal with respect to first surface 110 and second surface 120. Pitch control of input beams having angles of incidence outside this range is possible using the methods and devices of the present invention, however, the dimensional tolerances for the size of the patterned mirror more stringent for the steep angle of incidence case, and the actual dimensions get large for the shallow angle of incidence case. The methods of the present invention include the use of focusing and collimating elements to control input beam diameters and facilitate transmission of input beams and reflected input beams through transmissive regions 160a, 160b and 160c.

In addition to providing beam compression, beam array controller 100 of the present invention also provides for beam array expansion. Specifically, beam expansion is provided by reversing the input and output axes shown in FIGS. 1 and 2. For example, directing a set of input beams along output axis 205 will yield first and second sets of reflected output beams which combine in a manner providing beam array expansion. Accordingly, beam pitch controllers of the present invention are capable of providing either pitch compression or pitch expansion functionality dependent upon a selection of the appropriate orientation of the propagation axes of the set of input beams.

In a preferred embodiment of the present invention, the distance 130 separating first and second surfaces is selected to provide optimal beam transmission for a selected angle of incidence and extent of beam array compression or expansion. For an input beam set comprising an even number of parallel beams, the distance separating first and second surfaces is governed by the equation:

$$W = \frac{P_1(N-1) \times \frac{\cos(\theta_I)}{\sin(2 \times \theta_I)}}{M} \quad \text{(II)}$$

wherein W is the distance between first and second parallel surfaces, $\theta_1$ is the angle of incidence relative to surface normal, N is the number of beams in the set of input beams, $P_1$ is the spacing between the propagation axes of adjacent beams in the input beam set (i.e. the pitch of the input beam set), and M is the extent of compression or expansion ($M=P_1/P_2$, where $P_2$ is the pitch of the set of output beams). For an input beam set comprising an odd number of parallel beams, the distance separating first and second parallel surfaces is governed by the equation:

$$W = \frac{P_1(N) \times \frac{\cos(\theta_I)}{\sin(2 \times \theta_I)}}{M} \quad \text{(III)}$$

wherein W, $\theta_1$, N, $P_1$ and M are as defined above with respect to equation II.

In a preferred embodiment, an exemplary beam pitch controller having a dual reflective surface geometry is configured to provide an extent of compression or expansion equal to 2. In one embodiment, for example, first and second surfaces are separated by a distance of 0.84 inch to provide beam array compression by a factor of two for a set of 6 parallel input beams having a 0.5 inch equidistant beam spacing and oriented at angles of incidence of 45° from surface normal with respect to first and second surfaces.

Figure 3:
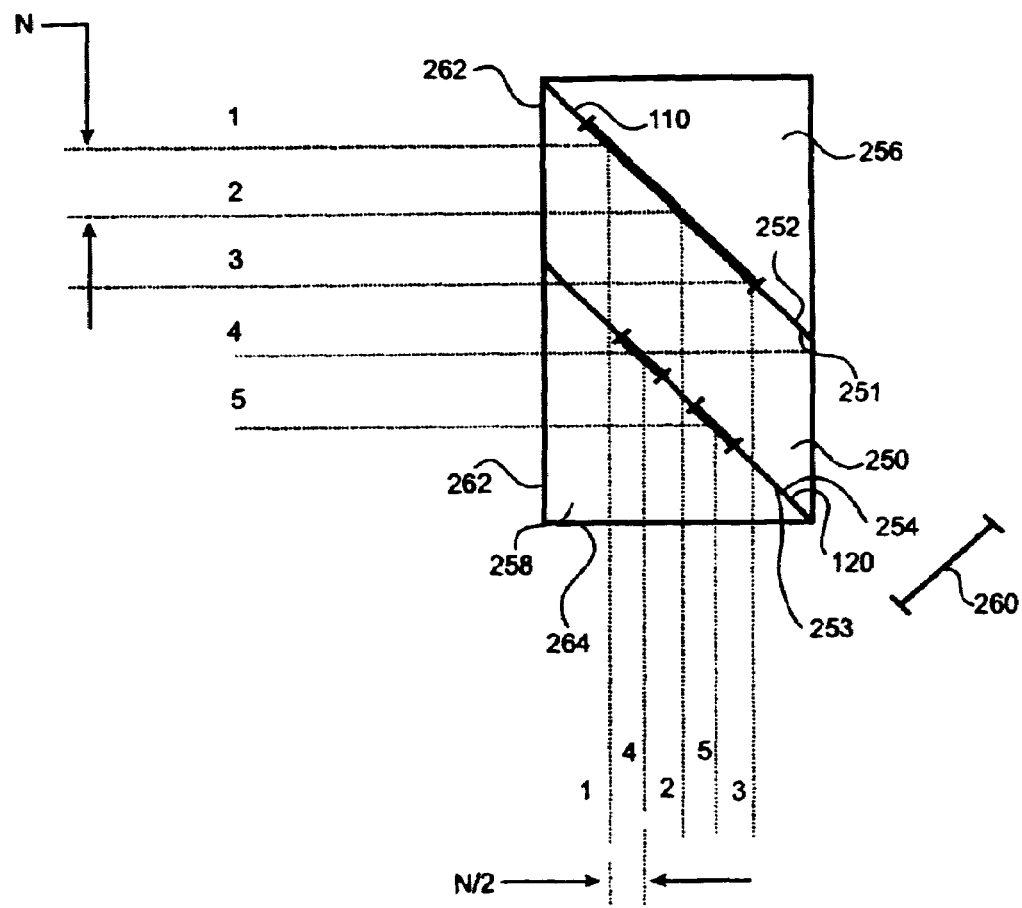
FIG. 3 is a schematic drawing showing a top plan view of an exemplary optical geometry for a beam array pitch controller capable of providing a fixed extent of beam array compression or expansion.

The present invention includes beam array pitch controllers providing a fixed extent of beam array compression or expansion for a selected angle of incidence. FIG. 3 illustrates an exemplary optical geometry for a beam array pitch controller capable of providing a fixed extent of beam array compression or expansion. The illustrated beam array pitch controller further comprises an alignment spacer 250 which is capable of maintaining a selected distance between first surface 110 and second surface 120. In the embodiment shown in FIG. 3, first surface 110 is an internal side 251 of a first prism element 256 and second surface 120 is an internal side 253 of second prism element 258. In a preferred exemplary embodiment, beam input surfaces 262 and beam output surface 264 of alignment spacer 250 and second prism element 258 have anti-reflection coatings to minimize unwanted reflections at these surfaces and to provide optically efficient beam pitch control. Alignment spacer 250 has a thickness 260 selected to provide a desired extent of compression or expansion for a selected angle of incidence and number of input beams. Alignment spacer 250 is in operational contact with first prism element 256 and second prism element 258. Preferred alignment spacers of the present invention do not significantly absorb (<1% absorption) the input or reflected beams and do not substantially affect the polarization states of input or reflected beams. Operational contact of alignment spacer 250, first prism element 256 and second prism element 258 can be provided by any means known in the art including, but not limited to, the use of optical contact bonding, optical adhesive or optical cement. Optical contact bonding is preferred for some applications because it is capable of providing a durable bond between alignment spacer 250, first prism element 256 and second prism element 258 without substantially degrading the transmission properties of the beam array pitch controller. An advantage of the illustrated design is that it allows for piece-by-piece assembly wherein reflective surfaces and transmissive surfaces on first and second prism elements are separately fabricated and subsequently operationally coupled to the alignment spacer.

In an alternative embodiment also providing a fixed extent of beam array compression or expansion for a selected angle of incidence, first surface 110 and second surface 120 are parallel first side 252 and second side 254, respectively, of alignment spacer 250. In one embodiment, first prism element 256 and second prism element 258 are operationally coupled to alignment spacer 250 to form protective layers shielding first and second surfaces from the ambient surroundings. An advantage of this embodiment of the present invention is that first side 252 and second side 254 of alignment spacer 250 can be fabricated to a very high extent of parallelism by conventional methods such as double sided lapping techniques.

As shown in FIGS. 1, 2 and 3, the pitch controllers of the present invention also provide a means of reordering of light beams comprising a set of input beams. Specifically, the output beams 185*a*, 185*b*, 185*c*, 185*d*, 185*e*, 185*f* generated by this embodiment reflect a reordering of input beams 175*a*, 175*b*, 175*c*, 175*d*, 175*e* and 175*f* to a new sequence corresponding to 175*a*, 175*d*, 175*b*, 175*e*, 175*c* and 175*f*. Beam array reordering provided by the present invention is useful for directing selected light beams in a beam array onto selected directors, beam coupling devices, fiber optic elements, or fiber optic devices.

Figure 4:
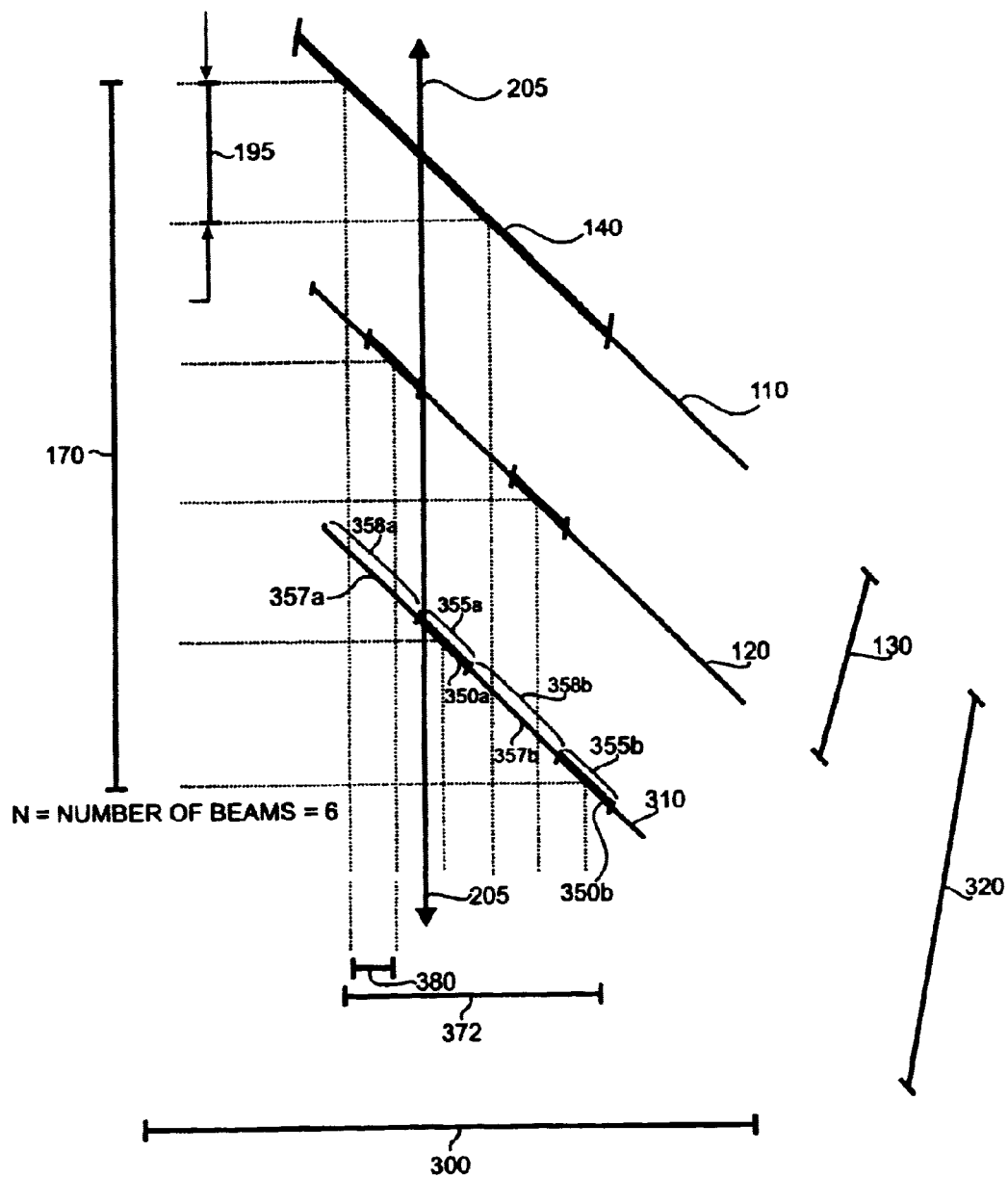
FIG. 4 is a schematic drawing showing an exemplary beam array pitch controller further comprising a third surface having a plurality of alternating reflective regions and transmissive regions, particularly useful for achieving beam compression or expansion by a factor of 3.

In an embodiment, beam array pitch controllers of the present invention further comprise one or more additional surfaces having a plurality of alternating reflective regions and transmissive regions. FIG. 4 illustrates an exemplary beam array pitch controller having an additional surface having a plurality of alternating reflective regions and transmissive regions, particularly useful for realizing beam compression or expansion by a factor of 3. The illustrated pitch controller 300 further comprises a third surface 310 which is positioned parallel to the first surface 110 and spaced apart from the first surface by a selected distance, X 320. In an exemplary embodiment, the distance separating first surface 110 and second surface 120 is equal to the distance separating second surface 120 and third surface 310. Third surface 310 has a plurality of reflective regions 350*a* and 350*b* which extend selected lengths 355*a* and 355*b*, respectively, along third surface 310. Third surface also has a plurality of transmissive regions 357*a* and 357*b* which extend selected lengths 358*a* and 358*b*, respectively, along third surface 310. To provide beam array compression, a set of input beams 170 are directed at first, second and third surfaces and generate first, second and third reflected sets of output beams. Combination of first, second and third reflected sets of output beams generates a set of output beams 372 propagating along optical axes parallel to an output axis 205. Output beams 372 are separated by a constant, second beam pitch, $P_2$ 380, which is different than first pitch, $P_1$ 195. In a preferred embodiment, $P_2$ 380 is equal to one third of $P_1$ 195. In an exemplary preferred embodiment, wherein first and second surfaces are separated by a distance of 1.179 inch and first and third surfaces are separated by a distance of 2.358, an input beam comprising 6 beams having a pitch equal to 1 inch is compressed by a factor of 3.

The present invention includes embodiments have a plurality of additional surfaces having alternating reflective regions and transmissive regions. Use of additional surfaces having alternating reflective regions and transmissive regions in the present invention is particularly beneficial for providing a larger extent of beam array pitch compression or expansion than embodiments having a dual parallel, reflective surface optical geometry.

The present invention includes beam array pitch compressors for adjusting the pitch of a two-dimensional beam array. In this embodiment the input beams comprise an array of input light beams, preferably parallel input beams, positioned along multiple defining axes which are orthogonal to input axis 190. Beam sets interact with first and second surfaces to provide beam array compression or expansion in at least one of the one dimensions defining the two-dimensional array.

Reflective regions in the present invention can comprise any surface, optical coating, plurality of optical coatings or optical element which provides high reflectivity, preferably for some applications reflectivity greater than 90% reflectivity and more preferably for some applications greater than 99% reflectivity. Exemplary reflective regions of the present invention comprise one or more thin film layers including but not limited, to dielectric film layers, semiconductor layers, metal layers or any combination of these. Exemplary thin film reflective regions of the present invention have a number of thin film layers selected from the range of about 1 to about 50 thin film layers. Use of thin film layers comprising a plurality of thin dielectric films having alternating high and low indices of refraction is preferred for applications requiring high optical efficiency because they reflect light very efficiently with minimal absorption, preferably less than 1% absorption. Thin film layer reflective regions of the present invention can be fabricated by deposition methods, particularly sputtering deposition methods, and lithography techniques well known in the art of the fabrication of optical devices.

In an alternative embodiment, reflective regions of the present invention comprise total internal reflection (TIR) surfaces. The use of TIR surfaces in the present invention is particularly advantageous for certain applications. First, embodiments of the present invention including TIR surfaces provide highly versatile beam array controllers and pitch controllers, which are capable of efficiently controlling beam arrays corresponding to wide range of light sources and a wide range of wavelengths because TIR surfaces exhibit high reflectivity over a broad range of wavelengths of light, preferably for some applications reflectivities greater than 99% over a wave length range of at least 300 nm. Second, use of TIR surfaces in the present invention is beneficial for applications requiring the polarization scheme of input beams to be maintained because the phase change between s- and p-polarization components is minimized in TIR. Additionally, TIR surfaces can be coated with one or more thin film coatings to further minimize or control the phase difference between s- and p-polarization components upon reflection. Third, TIR surface are compatible with high intensity light beams, such as diode laser light beams, and thus, can provide high optical efficiency for applications involving high intensity light beams.

Figure 5:
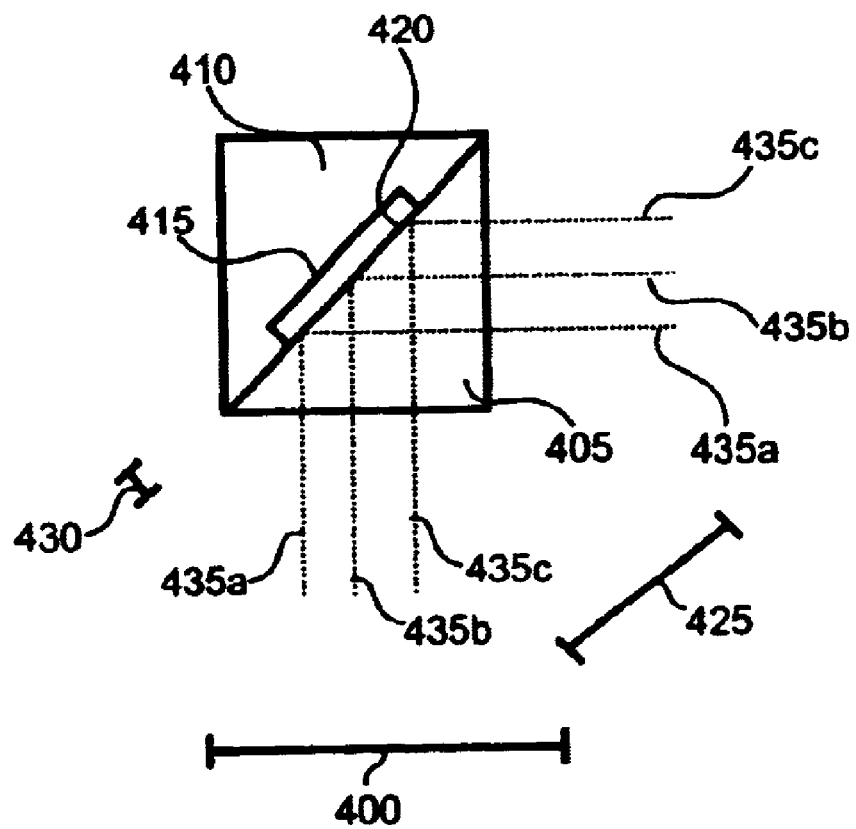
FIG. 5 is a schematic drawing showing a top plan view of an exemplary reflective region useful in the present invention comprising an enclosed TIR surface.

FIG. 5 shows a top plan view of exemplary reflective region useful in the present invention comprising an enclosed TIR surface. The enclosed TIR surface 400 comprises substrate 405 operationally coupled to an enclosing element 410. TIR cavity 415 is formed between enclosed TIR surface 420 of substrate 405 and enclosing element 410. TIR cavity 415 can be any shape which provides substantial total internal reflection, including cuboid shaped. Enclosed TIR cavity extends a selected length 425 along substrate 405 and has a selected thickness 430. Thickness 430 is preferably great enough to avoid the occurrence of frustrated total internal reflection. In a preferred embodiment, thickness 430 is greater than about 3 wavelengths corresponding to the wavelength of light of an incident beam, more preferably greater than about 6 wavelengths of light of an incident beam. Length 425 is preferably large enough to reflect substantially all of an incident beam or plurality of incident beams.

In a preferred embodiment, TIR surface 420 is ultra flat, ultra smooth and completely enclosed by enclosing element 410. Use of ultra flat and ultra smooth surfaces for total internal reflection is beneficial for providing high reflectivity and avoiding diffuse reflection. In an exemplary embodiment, TIR cavity 415 is filled with air at standard temperature and pressure and substrate 405 is $SiO_2$. The TIR cavity can comprise any material or plurality of materials having a lower index of refraction than that of substrate 405. In exemplary embodiments, TIR cavity is filled with a gas or plurality of gases, is a vacuum or comprises a dielectric material having an index of refraction less than that of substrate 405. Substrate 405 can have any shape which includes a flat and smooth TIR surface 420 and can comprise any material having a larger index of refraction than that of TIR cavity 415. Enclosing element 410 can comprise any material capable of surrounding and protecting enclosed TIR surface 420 including, but not limited to, dielectric materials, polymeric materials, plastics, thermoplastics, thermosets, glass, semiconductor materials and metals. Preferred enclosing elements 410 include a unitary piece of $SiO_2$ or polymeric material having a cavity volume removed therein. TIR cavities of the present invention can be fabricated by any material removal method including sonic milling, surface grinding or chemical etching. In addition, TIR cavities of the present invention can also be produced by building up the material around the cavity using spacers or thin film coatings. The positioning and dimensions of the cavity can be precisely controlled using either photoresists patterning or CNC machining.

Also shown in FIG. 5 are the optical paths of incident beams 435a, 435b and 435c. Incident beams 435a, 435b and 435c are directed onto enclosed TIR surface 420 and are substantially reflected by total internal reflection. Although incident beams 435a, 435b and 435c in FIG. 5 are oriented at angles of incidence equal to 45°, the enclosed TIR surfaces of the present invention are capable of use with other incident beam orientations that are greater than the critical angle required to generate TIR. The enclosed TIR optical geometry of the present invention is beneficial for several reasons. First, enclosing element 410 protects the TIR surface 420, thereby, preventing degradation due to deposition of materials on to TIR surface 420. Second, enclosing element 410 also serves to preventing deformation of the surface by physical and chemical processes such as scratching, denting, chipping or etching. Third, use of enclosed TIR surfaces is advantageous because the optical geometry of these surfaces places fewer limitations on the overall optical geometry of the optical components than conventional exposed TIR surfaces. Therefore, enclosed TIR surfaces are capable of convenient and easy integrated into complex optical devices, such as the beam array controllers and pitch controllers of the present invention.

Figure 6:
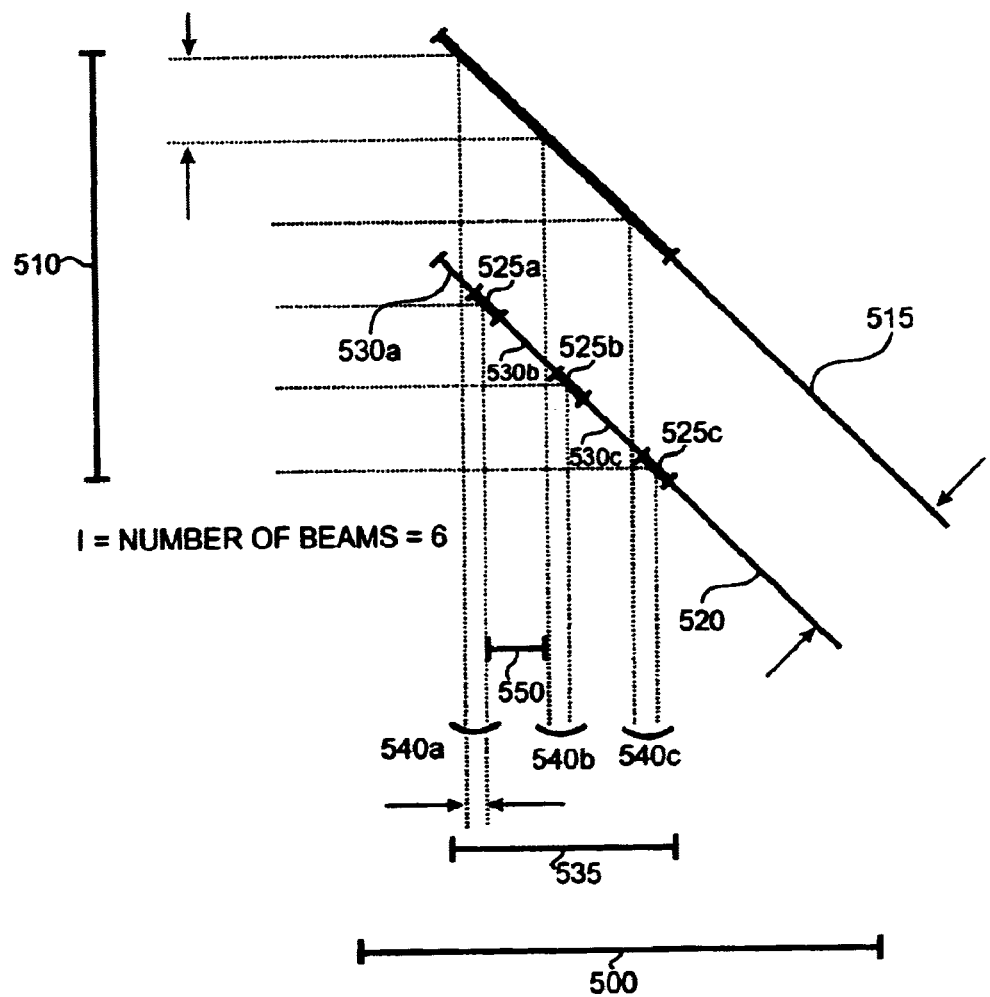
FIG. 6 is a schematic drawing showing a top plan view of an exemplary beam array controller of the present invention capable of providing non-equidistant beam array compression.

The present invention also comprises beam array controllers which are capable of generating a plurality of output beams wherein adjacent output beams are not evenly spaced. FIG. 6 shows an exemplary beam array controller 500 of the present invention capable of providing non-equidistant beam array compression. As shown in FIG. 6, a set of parallel input beams 510 having a constant pitch is directed at first surface 515 and second surface 520 of the illustrate beam array controller. Reflective regions 525a, 525b and 525c and transmissive regions 530a, 530b and 530c of second surface 520 are positioned such that output beams 535 comprise three discrete beam pairs 540a, 540b and 540c, which are separated by distance 550. Beam array controllers of the present invention capable of providing non-equidistant beam array compression are useful for separating a set of input beams into spatially segregated beam sub-groups. In addition, beam array controllers of the present invention capable of providing non-equidistant beam array compression are useful transforming a symmetrically spaced input beam set into an asymmetrically spaced output beam set.

Figure 7:
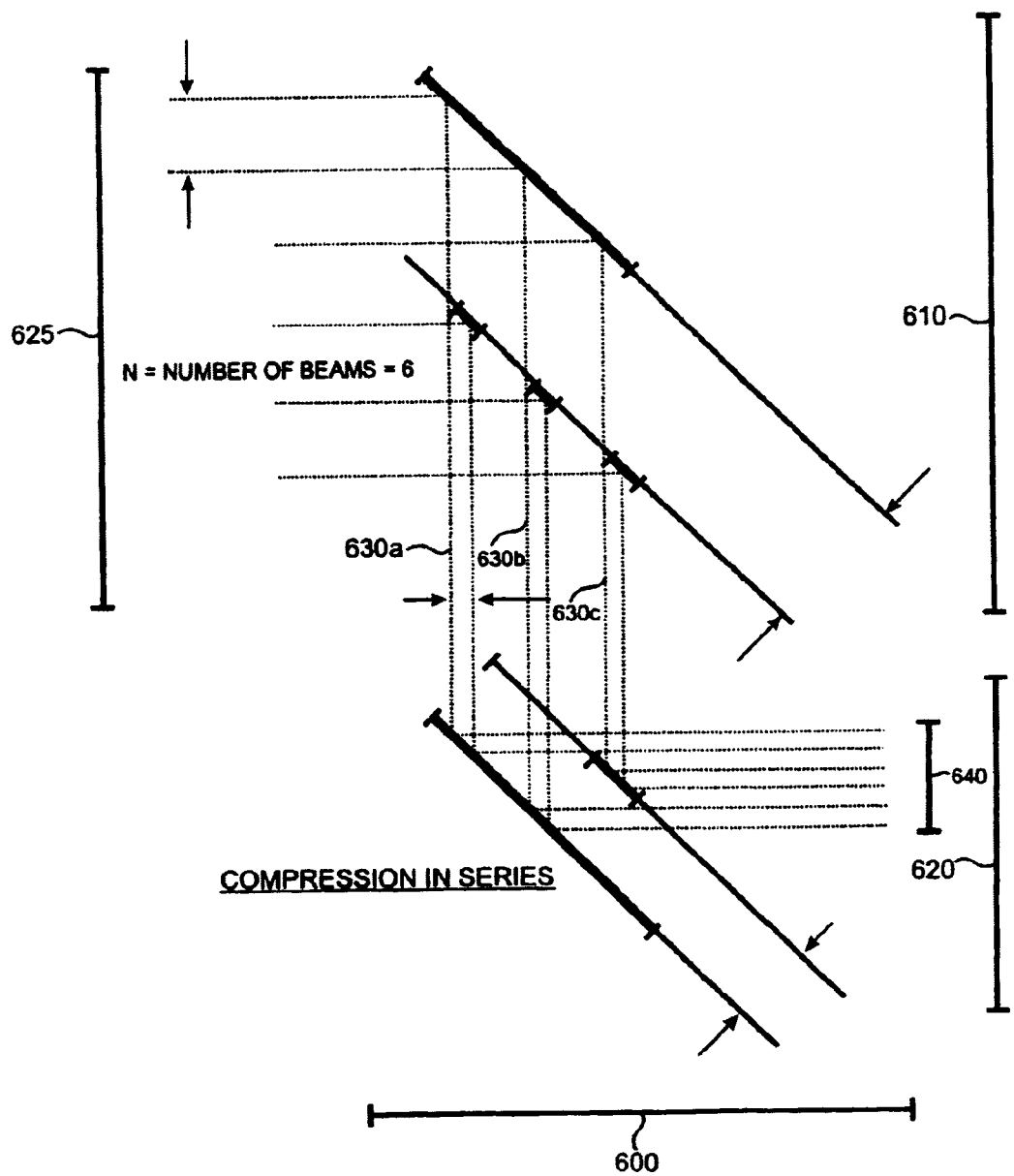
FIG. 7 is a schematic drawing showing a top plan view of an exemplary optical configuration of the present invention comprising two beam array controllers optically arranged in series.

In one embodiment, a plurality of beam array controllers and pitch compressors of the present invention are operationally coupled in series to precisely manipulate the spatial and/or optical characteristics of a beam array. FIG. 7 shows an exemplary optical geometry of the present invention comprising two beam array controllers optically arranged in series, particularly useful for realizing beam array pitch compression or expansion by a factor of 4. The exemplary optical geometry 600 comprises first beam array controller 610 in optical communication with second beam array controller 620. Set of 6 input beams 625 having a first pitch, $P_1$, is directed on first beam array controller 610 and undergoes non-equidistant beam array compression generating a set of output beams comprising three discrete beam pairs 630a, 630b and 630c. Discrete beam pairs 630a, 630b and 630c are subsequently directed onto second beam array controller 620 wherein beam pairs undergo pitch compression to generate a set of 6 output beams 640 having a second pitch, $P_2$, wherein $P_2$ $P_1$. In a preferred embodiment, the optical geometry shown in FIG. 7 is capable of generating a second pitch which is equal to one fourth of the first pitch, $P_1$. In an exemplary embodiment providing beam array compression by a factor of 4 for a set of 6 input beams having a 0.500 inch first pitch, first and second surfaces of the first beam array controller 610 are separated by a distance of 0.972 inch and first and second surfaces of the second beam array controller 620 are separated by a distance of 0.530 inch. In one embodiment, beam array controllers and beam array pitch controllers of the present invention are arranged in parallel. As will be clear to a person of ordinary skill in the art, the exemplary embodiment shown in FIG. 7 is but one means of combining one or more beam array controllers of the present invention. All possible other combinations and methods of coupling beam controllers and pitch compressors in series are within the scope of the present invention.

Figure 8A:
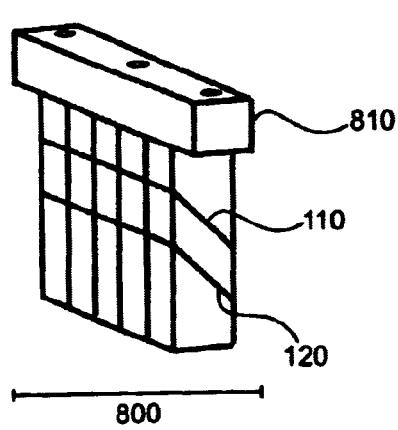
FIG. 8 is a schematic drawing showing a perspective view of an exemplary beam array pitch compressor cartridge of the present invention.
Figure 8B:
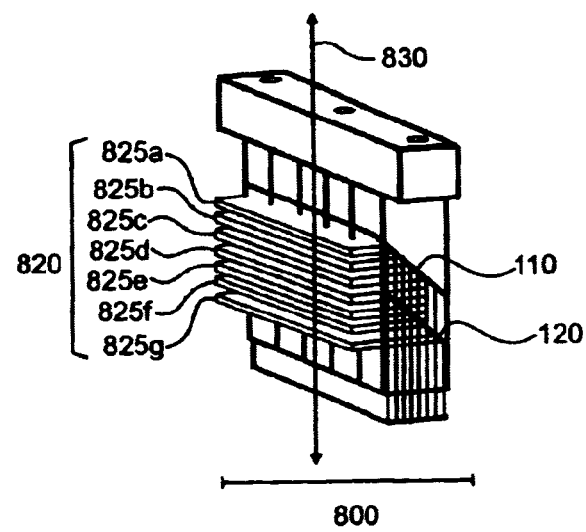

Beam array controllers and beam array pitch controllers of the present invention can be used a stand alone optical component or can be a device component in an integrated optical device. In an exemplary embodiment, a beam array pitch compressor of the present invention comprises a cartridge which can be easily integrated into an optical system, such as a diode laser bar array light sources or plurality of wide area emitter sources. FIGS. 8A and 8B are schematic drawings showing an exemplary beam array pitch compressor cartridge 800, particularly well suited for efficient optical coupling to a plurality of linear bar array optical sources. As shown in FIG. 8A, mounting system 810 is provided for incorporating the beam array pitch compressor cartridge 800 into an integrated optical device. Mounting system 810 can comprise any system capable of effectively engaging and securing beam array pitch compressor cartridge 800 including, but not limited to, the use of set screws, braces, clamps, selectively adjustable optical positioners, nuts, bolts, latches, rivets and other equivalents well-known in the art. FIG. 8B shows a set of input beams 820 (individually 825a, 825b, 825c, 825d, 825e, 825f and 825g) which can be a two-dimensional beam array comprising seven separate linear (one-dimensional) beam arrays or can be light beams generated by a plurality of wide area emitters. As illustrated in FIG. 8, beam array pitch compressor cartridge 800 changes the spacing along pitch adjustment axes 830 between individual linear beam arrays or individual light beams generated by a plurality of wide area emitters.

Beam array controllers and pitch compressors of the present invention are compatible with input beams having wide variety of optical and spatial characteristics. The present invention includes methods and devices for controlling a set of parallel or non-parallel input beams. Input beams controllable by the present invention can be symmetrically disposed along an axis perpendicular to their propagation axes or can be asymmetrically arranged. The present invention includes methods and devices for controlling input beams having very high intensities. The beam array controllers and pitch compressor of the present invention can control light beams from a wide range of sources including but not limited to, pulse lasers, continuous wave lasers, diode laser bar arrays, Nd:YAG lasers, HeNe lasers, excimer lasers, gas lasers, solid state lasers, wide area emitter optical sources and non-laser light sources. The methods and devices of the present invention can accommodate a set of input beams comprising any number of individual beams. In an embodiment, the beam array controllers and pitch compressors of the present invention are configured to receive a number of input beams selected over the range of about 5 to about 30 input beams.

The present invention includes methods of manipulating the brightness spatial distribution of a beam array, preferably a parallel beam array. By decreasing the spacing between adjacent beams in a beam array the brightness of a beam array is capable of being selectively increased, and by increasing the spacing between adjacent beams in a beam array the brightness of a beam array is capable of being selectively decreased. Beam array controllers and pitch compressors of the present invention are capable of selectively manipulating the brightness spatial distribution of a plurality of beams. In a preferred embodiment, beam array controllers and pitch compressors of the present invention are capable of adjusting the brightness spatial distribution of a beam array along a defining axis oriented orthogonal to the propagation axes of the light beams in the array.

Beam array controllers and beam array pitch controllers of the present invention can comprise device components in a variety of optical devices including but not limited to light sources, lasers, optical signal generators, light filters, detectors, fiber optic routing devices, optical alignment systems, add/drop filters and interferometers. Beam array controllers and beam array pitch controllers of the present invention can be directly or indirectly operationally coupled to a variety of devices including but not limited to focusing elements, collimating elements, lasers, detectors, reflectors, polarizers, interference filters, fiber optic couplers, light sources, temperature controllers, temperature sensors and optical sources. Beam array controllers and beam array pitch controllers of the present invention can be used separately to provide beam array control or a series of the beam array controllers and beam array pitch controllers of the present invention can be used to provide beam array control.

All references cited in this application are hereby incorporated in their entireties by reference herein to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

We claim:

1. An optical device for changing the pitch of a set of input beams propagating along optical axes parallel to an input axis and having a first pitch, $P_1$, comprising:
   a first surface having a reflective region for receiving at least a portion of said set of input beams and for generating a first reflected set of beams propagating along optical axes parallel to an output axis which is different than said input axis; and
   a second surface positioned parallel to said first surface and spaced apart from said first surface by a first selected distance, W, said second surface having a plurality of reflective regions and a plurality of transmissive regions disposed on said second surface in a sequence that alternates between transmissive regions and reflective regions, wherein said second surface receives at least a portion of said set of input beams and, wherein said alternating reflective regions and transmissive regions are positioned such that said input beams received by said second surface are reflected by said reflective regions, thereby generating a second reflected set of beams propagating along optical axes parallel to said output axis, and said first reflected set of beams are transmitted by said transmissive regions;
   whereby said first and second reflected sets of beams combine to form a set of output beams propagating along optical axes parallel to said output axis and having a second pitch, P2, wherein P2 does not equal P1.

2. The optical device of claim 1 comprising a beam array pitch compressor, wherein $P_2$ is less than $P_1$.

3. The optical device of claim 1 comprising a beam array pitch expander, wherein $P_2$ is greater than $P_1$.

4. The optical device of claim 1 wherein said first and second surfaces are planar.

5. The optical device of claim 1 wherein said first and second surfaces are curved.

6. The optical device of claim 1 wherein said input beams have angles of incidence of about 45° from surface normal with respect to first and second surfaces.

7. The optical device of claim 1 wherein said input beams have angles of incidence selected over the range of about 25° to about 65° from surface normal with respect to said first and second surfaces.

8. The optical device of claim 1 wherein said output axis is orthogonal to said input axis.

9. The optical device of claim 1 wherein said set of input beams comprises an even number of beams.

10. The optical device of claim 9 wherein said input beams have an angle of incidence ($\theta_1$) with respect to first and second surfaces, wherein the pitch of said set of input beams is compressed or expanded by a selected extent of compression or expansion (M), wherein said first and second surfaces are separated by a distance provided by the equation:

$$W = \frac{P_1(N-1) \times \frac{\cos(\theta_I)}{\sin(2 \times \theta_I)}}{M}$$

wherein W is the distance separating said first and second surfaces, N is the number of input beams, M is the extent of compression or expansion, $P_1$ is the pitch of the set of input beams and $\theta_1$ is the angle of incidence.

11. The optical device of claim 1 wherein said set of input beams comprises an odd number of parallel beams.

12. The optical device of claim 11 wherein said input beams have angle of incidence ($\theta_1$) with respect to first and second surfaces, wherein the pitch of said set of input beams is compressed or expanded by a selected extent of compression or expansion (M), wherein first and second surfaces are separated by a distance provided by the equation:

$$W = \frac{P_1(N) \times \frac{\cos(\theta_I)}{\sin(2 \times \theta_I)}}{M}$$

wherein W is the distance separating first and second surfaces, N is the number of number of input beams, M is the extent of compression or expansion, $P_1$ is the pitch of the set of input beams and $\theta_1$ is the angle of incidence.

13. The optical device of claim 1 wherein said reflective region of said first surface and said reflective regions of said second surface have a reflectivity greater than 90%.

14. The optical device of claim 1 wherein said reflective region of said first surface comprises a plurality of thin film layers having alternating high index of refraction and low index of refraction layers.

15. The optical device of claim 1 wherein said reflective region of said first surface comprises a thin metallic layer.

16. The optical device of claim 1 wherein said reflective region of said first surface comprises a TIR surface.

17. The optical device of claim 1 wherein said reflective region of said first surface comprises an enclosed TIR surface having a TIR surface that is substantially surrounded by one or more enclosing elements.

18. The optical device of claim 1 wherein said reflective regions of said second surface comprise pluralities of thin film layers having alternating high index of refraction and low index of refraction layers.

19. The optical device of claim 1 wherein said reflective regions of said second surface comprise thin metallic layers.

20. The optical device of claim 1 wherein said reflective regions of said second surface comprise TIR surfaces.

21. The optical device of claim 1 wherein said reflective regions of said second surface comprise enclosed TIR surfaces having a TIR surface that is substantially surrounded by one or more enclosing elements.

22. The optical device of claim 1 wherein said transmissive regions of said second surface comprise antireflection coatings.

23. The optical device of claim 1 further comprising an alignment spacer positioned between said first and said second surfaces for maintaining a constant distance, W, between said first and second surfaces.

24. The optical device of claim 1 wherein said first surface is an internal side of a first prism element and said second surface is an internal side of a second prism element.

25. The optical device of claim 24 further comprising an alignment spacer positioned between said first and said second surfaces for maintaining a constant distance, W, between said first and second surfaces, wherein said alignment spacer has a first end in contact with said internal side of said first prism element and a second end in contact with said internal side of said second prism element.

26. The optical device of claim 25 wherein said external first end of said alignment spacer is operationally coupled to said first surface by optical contact and said second end of said alignment spacer is connected to said second surface by optical contact.

27. The optical device of claim 25 wherein said external first end of said alignment spacer is operationally coupled to said first surface by optical adhesive and said second end of said alignment spacer is connected to said second surface by optical adhesive.

28. The optical device of claim 1 further comprising an alignment spacer for maintaining a constant distance, W, between said first surface and said second surface, said alignment spacer having a first end and a second end, wherein said first surface is said first end of said alignment spacer and said second surface is said second end of said alignment spacer.

29. The optical device of claim 1 comprising a beam array pitch controller.

30. The optical source of claim 1 wherein said set of output beams comprises a plurality of beams that sequentially alternate between said first and second reflected sets.

* * * * *

UNITED STATES PATENT AND TRADEMARK OFFICE
CERTIFICATE OF CORRECTION

PATENT NO. : 7,023,620 B1
APPLICATION NO. : 10/885297
DATED : April 4, 2006
INVENTOR(S) : Sandberg et al.

It is certified that error appears in the above-identified patent and that said Letters Patent is hereby corrected as shown below:

<u>In the Specification:</u>

In column 1, line 35, please replace "has" with --have--.

In column 2, line 42, please replace "beams beam" with --beams--.

In column 3, line 22, please replace "a input" with --an input--.

In column 3, line 47, please replace "$P_{2=2}P_1$" with --$P_2=2P_1$--.

In column 3, line 48, please replace "generated" with --generating--.

In column 3, line 65, please delete the comma after "parallel".

In column 4, line 56, please replace "first and external second sides" with --first and second sides--.

In column 6, line 24, please replace "selectively" with --selective--.

In column 6, line 38, please replace "a input axis" with --an input axis--.

In column 6, line 62, please replace "parallel to a" with --parallel to an--.

In column 8, line 26, please replace "set of a parallel" with --set of parallel--.

In column 8, line 42, please replace "beams in beam array" with --beams in a beam array--.

In column 8, line 51, please replace "absolutely" with -- absolute--.

In column 9, line 6, please replace "form" with --from--.

In column 9, lines 21 and 22, please replace "absolutely absolute" with --absolute--.

In column 10, line 33, please replace "complete" with --completely--.

In column 13, line 24, please replace "mirror more" with --mirror are more--.

In column 15, line 49, please replace "have" with --having--.

UNITED STATES PATENT AND TRADEMARK OFFICE
CERTIFICATE OF CORRECTION

PATENT NO. : 7,023,620 B1
APPLICATION NO. : 10/885297
DATED : April 4, 2006
INVENTOR(S) : Sandberg et al.

It is certified that error appears in the above-identified patent and that said Letters Patent is hereby corrected as shown below:

In column 17, line 44, please replace "integrated" with --integration--.

In column 17, line 65, please replace "useful transforming" with --useful for transforming--.

In column 18, line 38, please replace "used a" with --used as a--.

In column 18, line 43, please replace "as a diode" with --as diode--.

In column 19, line 63, please replace "resort" with --resorting--.

In column 22, line 20, please replace "said external first end" with --said first end--.

In column 22, line 25, please replace "said external first end" with --said first end--.

Signed and Sealed this

Seventeenth Day of October, 2006

JON W. DUDAS
*Director of the United States Patent and Trademark Office*